(12) United States Patent  
Ramsey

(10) Patent No.: US 7,454,344 B2  
(45) Date of Patent: Nov. 18, 2008

(54) LANGUAGE MODEL ARCHITECTURE

(75) Inventor: William Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 10/918,233

(22) Filed: Aug. 13, 2004

(65) Prior Publication Data

US 2006/0036428 A1 Feb. 16, 2006

(51) Int. Cl.
*G06F 17/27* (2006.01)
*G10L 15/18* (2006.01)
*G10L 15/28* (2006.01)

(52) U.S. Cl. .............................. 704/257; 704/9; 704/255

(58) Field of Classification Search ...................... 704/9, 704/255, 257
See application file for complete search history.

(56) References Cited

U.S. PATENT DOCUMENTS

| | | | | |
|---|---|---|---|---|
| 5,502,774 A | * | 3/1996 | Bellegarda et al. ........... | 382/159 |
| 2002/0178005 A1 | * | 11/2002 | Dusan et al. ................ | 704/254 |
| 2002/0194388 A1 | * | 12/2002 | Boloker et al. .............. | 709/310 |

OTHER PUBLICATIONS

Daniel Jurafsky & James H. Martin, 'Speech and Language Processing: An Introduction to Natural Language Processing, Computational Linguistics, and Speech Recognition'. 2000, Prentice-Hall, Inc., Section 6.2, pp. 196-206.*

D. Vaufreydaz et al. "A Network Architecture for Building Applications That Use Speech Recognition and/or Synthesis," European Conference on Speech Communication and Technology, Sep. 1999, pp. 2159-2162.

A. Klautau et al. "Server-Assisted Speech Recognition Over the Internet," citeseer.ist.psu.edu/klautau01serverassisted.html, 2001.

Hunt, A. and Walker, W.; "A Fine Grained Component Architecture for Speech Application Development," Sun Microsystems, Palo Alto, CA, Jun. 2000.

Bayer, S.; "Embedding Speech in Web Interfaces," Proc. ICSLP, Oct. 1996, pp. 1684-1687.

Tu, Z. and Loizou, P.; "Speech Recognition Over the Internet Using Java," Proceedings on IEEE International Conference on Acoustics, Speech, and Signal Processing, Mar. 1999, pp. 2367-2370.

J. Hasselgren et al., "HMS: A Predictive Text Entry Method Using Bigrams," citeseer.ist.psu.edu/709331.html 2002, pp. 1-7.

Hacioglu, K. and Pellom, B.; "A Distributed Architecture for Robust Automatic Speech Recognition," Proceedings of IEEE International Conference on Acoustics, Speech, and Signal Processing, Hong Kong, Apr. 2003, pp. 1-4.

* cited by examiner

*Primary Examiner*—David R Hudspeth
*Assistant Examiner*—Justin W Rider
(74) *Attorney, Agent, or Firm*—Westman, Champlin & Kelly, P.A.

(57) ABSTRACT

An architectural design is disclosed wherein a single reusable language model component is shared by multiple applications. The language model component is loaded once for a plurality of applications, thereby reducing the amount of memory consumed by the applications independently.

12 Claims, 4 Drawing Sheets

LANGUAGE MODEL ARCHITECTURE

BACKGROUND OF THE INVENTION

The present invention pertains to language model architecture. More specifically, the present invention pertains to an architectural design wherein a single language model component is shared by multiple applications.

Language models are implemented by a variety of applications including, but not limited to, applications that facilitate recognition of natural language, speech and handwriting inputs. Typically, a language model provides a probability of seeing a particular sequence of words. Language models can be modeled strictly from data, as is the case with n-grams, or modeled using heuristics, as with a parser.

It is not uncommon for language models to be large in size. Some language models consist of tens of millions of word combinations. This being the case, it is not uncommon for separate language models to be loaded for different applications. Such an organization scheme requires a significant investment of machine resources. For example loading multiple language model components for multiple applications requires a significant consumption of RAM resources. Further, the process of maintaining and updating multiple language models can be relatively redundant. Still further, it is not uncommon for the development and deployment of new applications to require incorporation of a devoted language model component.

SUMMARY OF THE INVENTION

Embodiments of the present invention pertain to an architectural design wherein a single reusable language model component is shared by multiple applications. The language model component is loaded once for a plurality of applications, thereby reducing the amount of memory consumed by the applications independently.

DETAILED DESCRIPTION OF ILLUSTRATIVE EMBODIMENTS

I. First Exemplary Environment

Figure 1:
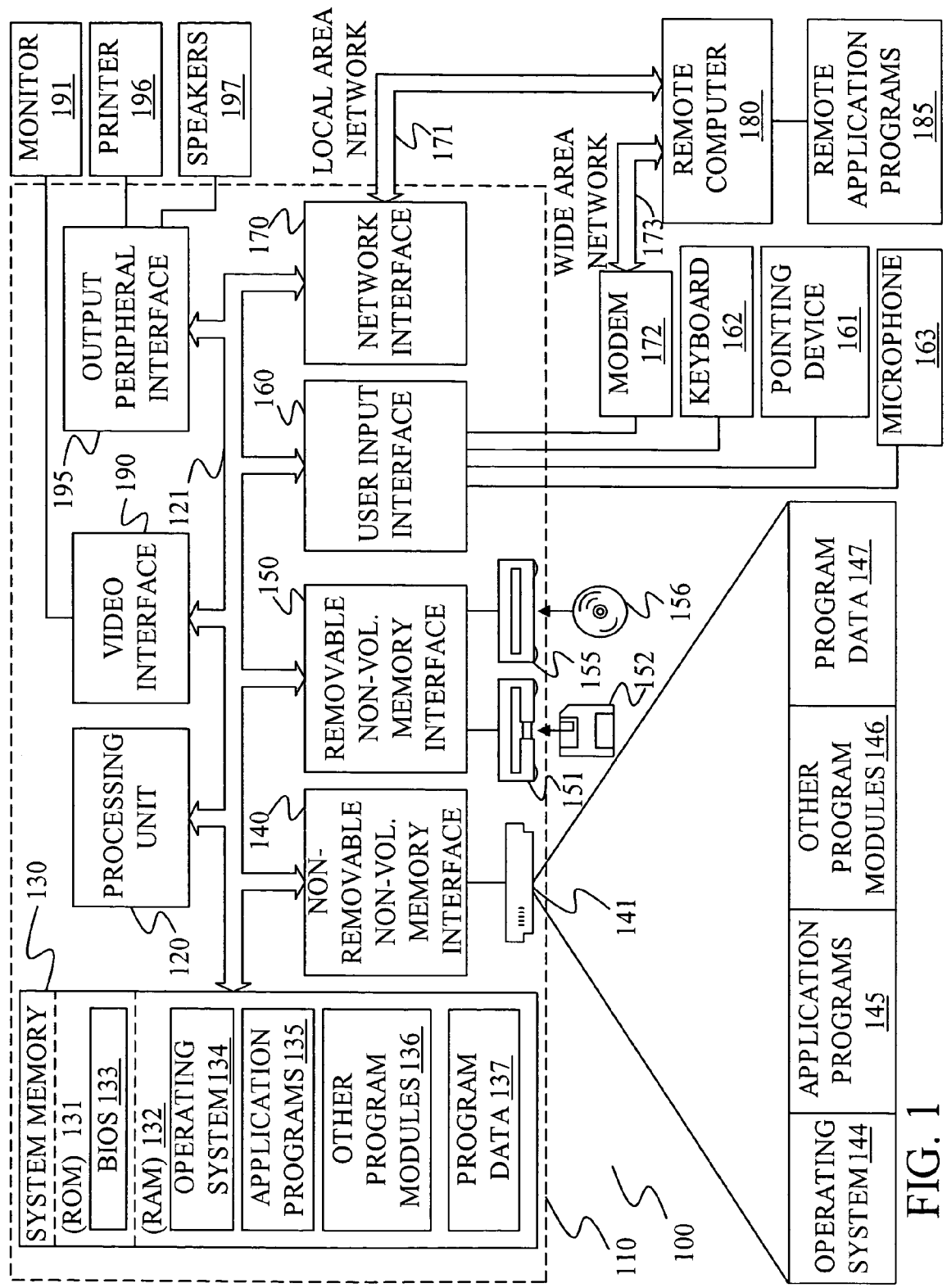
FIG. 1 is a block diagram of one computing environment in which the present invention may be implemented.

FIG. 1 illustrates an example of a suitable computing system environment 100 within which embodiments of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. Motivation for Centalized Language Model Architecture

Language models are known to support a variety of applications for a range of different purposes. For example, a language model can greatly assist with applications that incorporate disambiguation of similar-sounding phrases such as "I see you too" versus "eye sea ewe two" because the probability of seeing the former is much higher than the probability of seeing the latter. Examples of applications known to implement language models for such purposes are speech and handwriting recognition applications.

A language model can be implemented to support application having contextual spelling functionality. For example, a language model is helpful in situations like "send a frm letter" or "go frm there", where in the first case the "frm" will be corrected to "form" because "form letter" is quite common and in the second case will be corrected to "from" because "go from" is quite common. Similarly, a language model can be used to help correct phrases like "send a from letter" to "send a form letter" if the probability of the phrase with "from" is much higher than the original phrase. Handwriting recognition and other applications are known to implement language models for the described and other correction-oriented purposes.

Some parsing applications implemented language model functionality to address difficulties encountered with attachment ambiguity. For example, the sentence "I saw the man with the telescope" can either be interpreted as "I used the telescope to see the man" or "I saw the man carrying the telescope". A language model can be implemented to help disambiguate whether the prepositional phrase "with a telescope" attaches to "see" or "man" by determining if the probability of "see with a telescope" is larger than "man with a telescope".

Language models can be extremely large in size, potentially consisting of tens of millions of word combinations. For at least this reason, it becomes prohibitive to load separate language models for different applications. In addition, it is generally inefficient to maintain multiple language models, especially where adjustments or updates to be made should be the same or substantially similar from one model to the next. For a given machine or system, it is understandably less complicated to maintain a single language model rather than many (i.e., synchronization of data problems eliminated).

III. Centralized Language Model Architecture

One aspect of the present invention pertains to a language model architecture wherein a unified language model component is utilized to assist in the execution of tasks for multiple individual applications (e.g., multiple unrelated applications). The present invention is not limited to any specific technique to be implemented by an application for utilization of a language model component (e.g., standard COM or .NET CLR technology could be utilized). Instead, embodiments of the present invention are more generally focused on an overall architecture wherein one language model component is utilized to support several different applications. Among other benefits, the shared model architecture reduces the overall quantity of required computing resources, facilitates development and deployment of new applications that leverage a centralized language model component, and at least partially relieves the need to collect new data for multiple applications.

An accordance with one aspect of the present invention, a centralized language model component provides a framework for providing the probability of seeing a certain sequence of words according to any means including n-grams, heuristics, syntactic parsers, part-of-speech models, or other statistical techniques. Implementation of any means for computing the probability of a given word sequence, either via data-driven techniques or analytical techniques, is within the scope of the present invention.

In accordance with one aspect of the present invention, the centralized language model component can be configured in at least one of three different ways. Specifically, the centralized language model component can be configured as:

1. A standalone component containing all of the data and techniques for computing the probability of a given word sequence.
2. A component enabling applications to compute the probabilities of a given word sequence through supplying probabilities of partial sequences.
3. A component employing a secondary source for computing the probability of a given word sequence.

Figure 2:
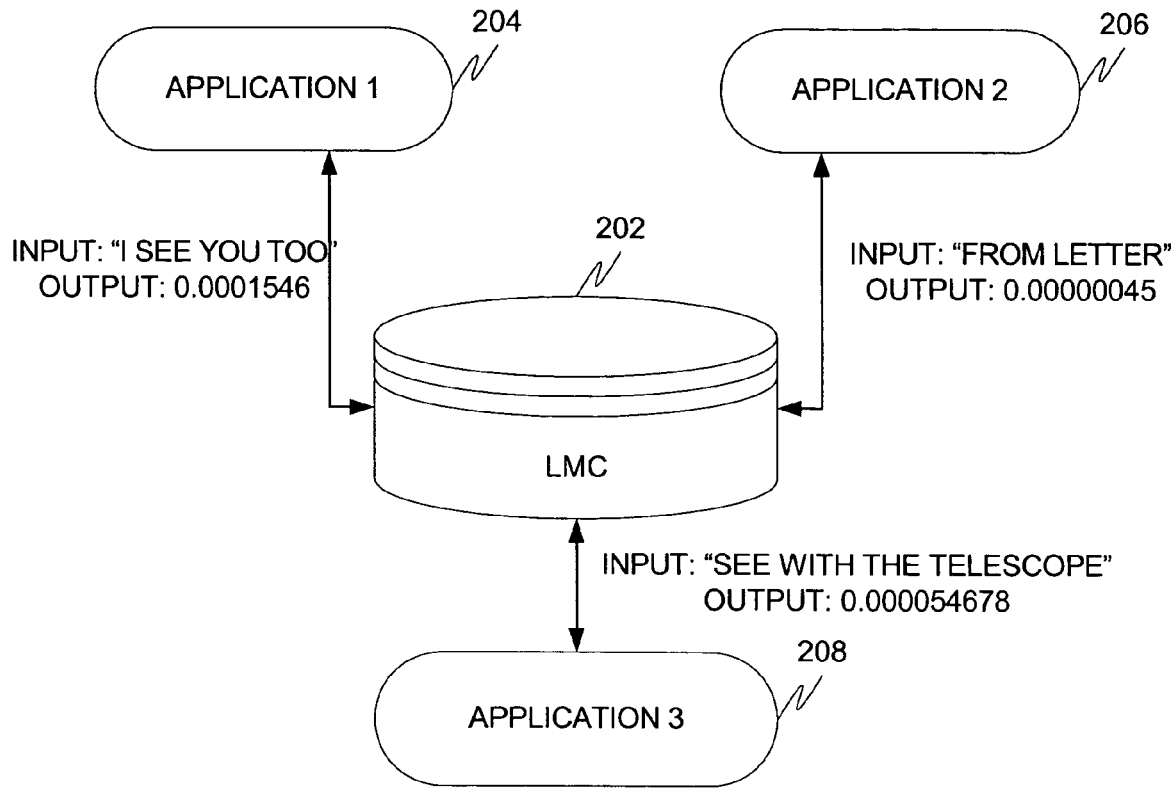
FIG. 2 is a schematic diagram illustrating a first language model component configuration.

FIG. 2 is a schematic diagram illustrating the first configuration for the centralized language model component. In this case, a standalone component 202 is equipped with the data and techniques necessary to compute the probability of a given word sequence. Component 202 loads all of the data and heuristics required for computing probabilities for any or all of applications 204, 206 and 208 (the applications could be any of those described in Section II or some other application). The applications provide component 202 with an input (e.g., a word sequence) and receive a corresponding probability. For example, component 202 receives inputs from the applications and provides output probabilities without having to access any other machine resources.

In accordance with one example of the first configuration, the probability of "I see you too" is obtained through one call to component 202. Similarly, the probability of "From Letter" and "See with the telescope" are also obtained through a single call. No secondary resources are utilized as the language model component 202 is equipped with the data and algorithms necessary to calculate the probability.

Figure 3:
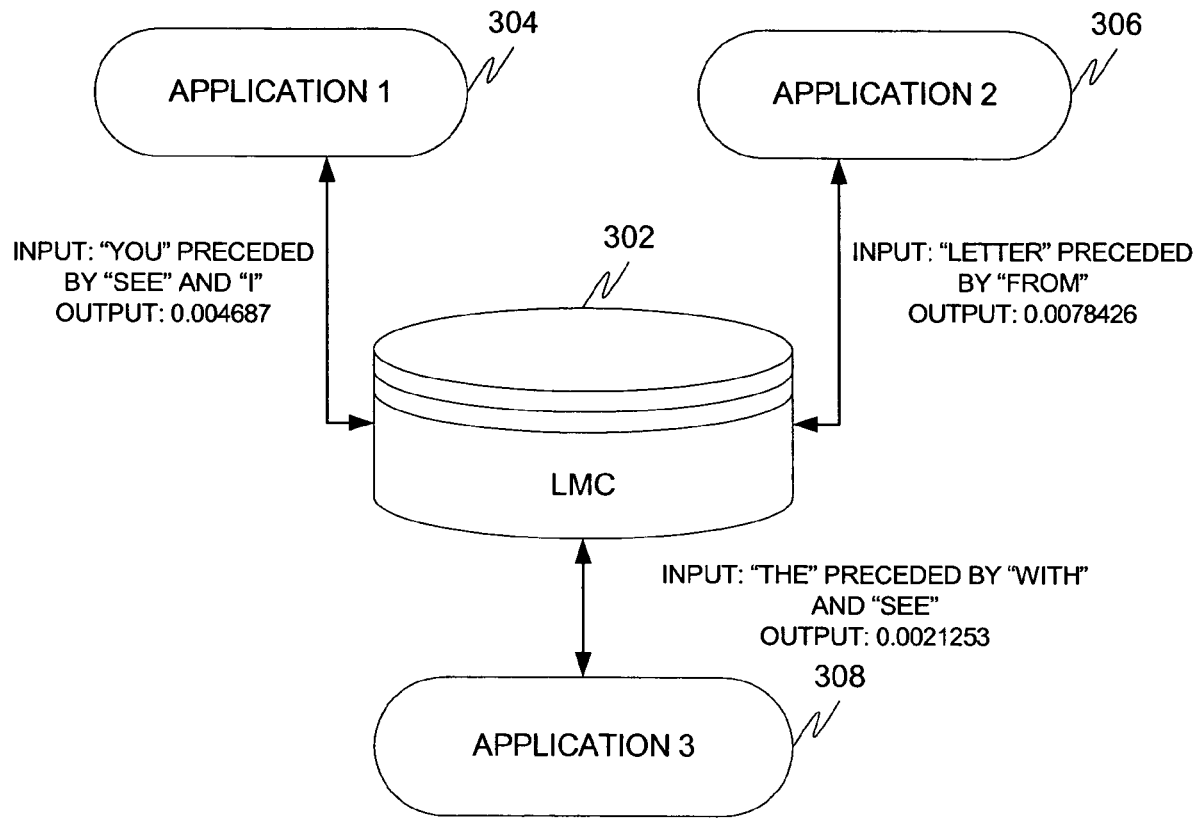
FIG. 3 is a schematic diagram illustrating a second language model component configuration.

FIG. 3 is a schematic diagram illustrating the second configuration for the centralized language model component. In this case, a component 302 is equipped to enable an external application to compute the probability of a given word sequence by supplying probabilities of partial sequences. In other words, component 302 provides an external application with enough information to compute the probability of a word sequence. The application the computes the probability could be applications 304, 306 and 308 (the applications could be any of those described in Section II or some other application) or could be a separate application to which those applications have access.

In accordance with one example of the second configuration, language model component 302 provides an application with probabilities of:

a word $P(w_1)$ a word given the previous word $P(w_2|w_1)$ a word given the two previous words $P(w_3|w_2, w_1)$ That application can then employee standard methods for computing probability P(WS) of the word sequence $WS=w_1, w_2, w_3, \ldots w_N$ as:

$$P(WS)=P(w_1)*P(w_2|w_1)*P(w_3|w_2, w_1)* \ldots P(w_N|w_{N-1}, w_{N-2} \ldots w_2, W_1)$$

Using a trigram approximation since trigrams are supported by this implementation:

$$P(WS) \sim P(w_1)*P(w_2|w_1)*P(w_3|w_2, w_1)* \ldots *P(w_N|w_{N-1}, w_{N-2})$$

The various probabilities that plug into the equations to supply the overall sequence probability are provided by language model component 302.

For example, P("I see you too") is obtained through multiple calls to component 302. Accordingly, the following quantities are gathered:

P("I")

P("see"|"I")

P("you"|"see", "I")

P("too"|"you", "see")

Thus:

P("I see you too")=P("I")*P("see"|"I")*
P("you"|"see", "I"))*P("too"|"you", "see")

Figure 4:
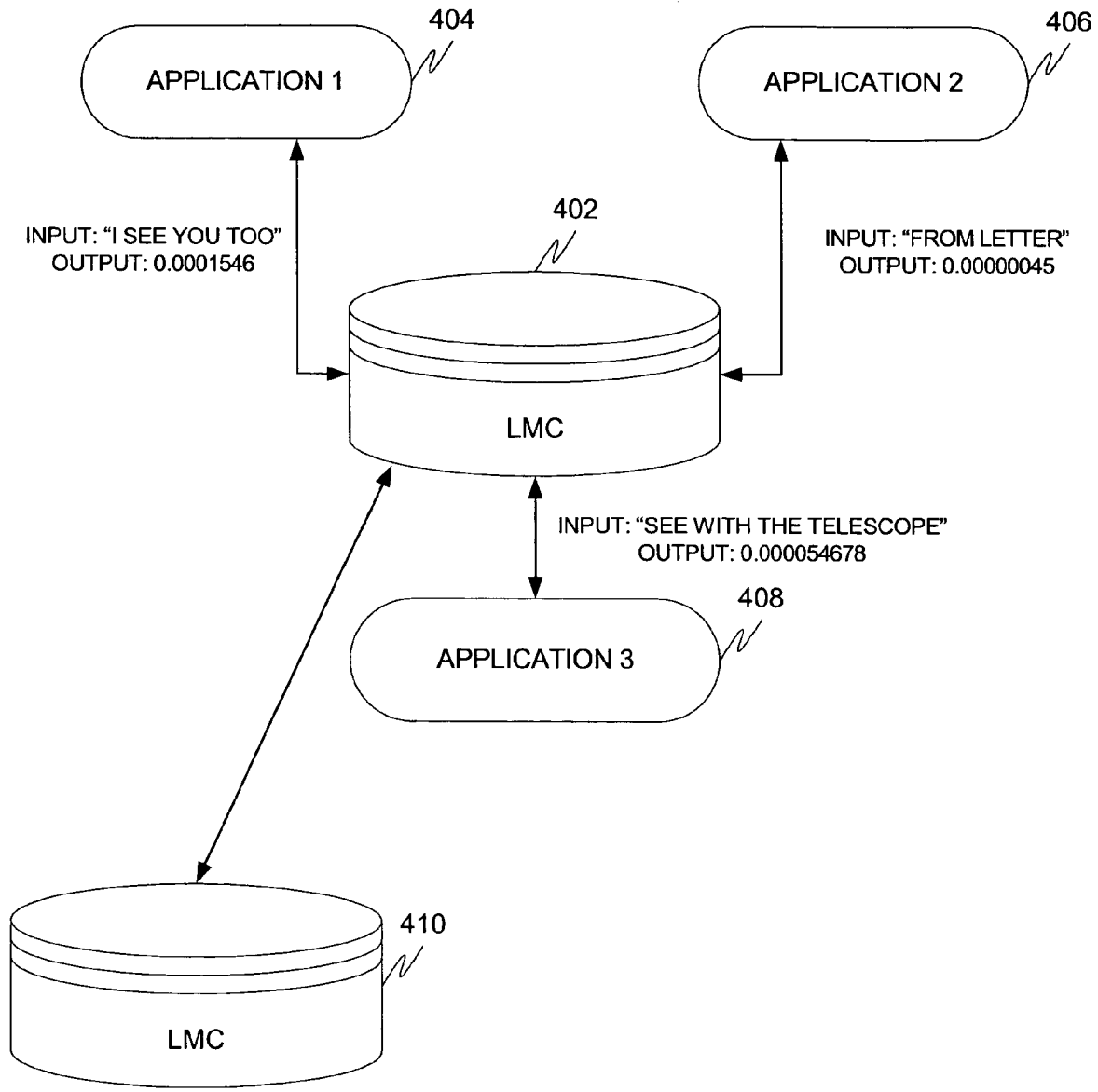
FIG. 4 is a schematic diagram illustrating a third language model component configuration.

FIG. 4 is a schematic diagram illustrating the third configuration for the centralized language model component. In this case, a component 402 interacts with applications 404, 406 and 408 (the applications could be any of those described in Section II or some other application) in a manner consistent with the first interaction configuration (FIG. 2). In other words, language model component 402 behaves like a standalone component and returns calculated probabilities for given word sequences. However, component 402 relies on a separate component 410 to get information necessary to compute a final probability for a given sequence.

In accordance with one example of the third configuration, one of applications 404, 406 and 408 obtain a final probability directly from language model component 402, which for illustrative purposes is referred to as the controlling component. Controlling component 402 then interacts with a separate component 410 in order to obtain information necessary to produce a final probability to be transferred to the requesting application. The nature of the information provided by component 410 to component 402 is contingent upon the makeup of component 402 but suffice it to say that they are configured to cooperate so as to enable component 402 to transfer a final probability for an input sequence to a requesting application. In one embodiment, controlling component 402 makes multiple calls to component 410 in order to obtain enough partial probabilities to generate a final probability for a given input sequence.

In one example, application 404 requests a probability of "I see you too". Controlling component 402 makes four calls to component 410 to obtain enough partial sequence probabilities to generate a total sequence probability. The total probability is calculated and transferred to application 404. In essence, component 402 behaves to applications 404, 406 and 408 like the first configuration yet is implemented like the second configuration.

Although the present invention has been described with reference to particular embodiments, workers skilled in the art will recognize that changes may be made in form and detail without departing from the spirit and scope of the invention.

What is claimed is:

1. A computer-implemented system for centralizing language model functionality, the system comprising:
   a first application configured to provide a first word sequence;
   a second application configured to provide a second word sequence;
   a language model component for processing the first and second word sequences, wherein the language model component includes a framework for generating a probability of encountering the first word sequence, as well as the probability of encountering the second word sequence;
   wherein the language model component is configured to provide the first word sequence to a second language model component;
   wherein the language model component is configured to provide the second word sequence to the second language model component;
   wherein the language model component is configured to receive from the second language model component a second set of probabilities representing a likelihood of encountering at least two sub-components of the second word sequence;
   wherein the language model component is further configured to support a processing of the second set of probabilities so as to enable generation of an overall probability of encountering the second word sequence; and
   wherein the first language model component is configured to provide the overall probability to the second application.

2. The system of claim 1, wherein the first application is an application selected from a group consisting of a speech recognition application, a handwriting recognition application, a contextual spelling application, a proofreading application, and a parsing application.

3. The system of claim 2, wherein the second application is a different application selected from said group.

4. The system of claim 1, wherein the first application is a natural language processing application and the second application is a speech recognition application.

5. The system of claim 1, wherein the language model component is configured to receive from the second language model component a first set of probabilities representing a likelihood of encountering at least two sub-components of the first word sequence.

6. The system of claim 5, wherein the first language model component is further configured to support a processing of the first set of probabilities so as to enable generation of an overall probability of encountering the first word sequence.

7. The system of claim 6, wherein the first language model component is configured to provide the overall probability to the first application.

8. A computer-implemented method for centralizing language model functionality, the method comprising:
   receiving a first word sequence from a first application;
   receiving from a language model component a set of probabilities representing a likelihood of encountering at least two sub-components of the first word sequence;
   generating, based at least in part on the set of probabilities, an overall probability representing a likelihood of encountering the first word sequence;
   providing the overall probability to the first applications;
   receiving a second word sequence from a second application;
   receiving from the language model component a second set of probabilities representing a likelihood of encountering at least two sub-components of the second word sequence;
   generating, based at least in part on the second set of probabilities, a second overall probability representing a likelihood of encountering the second word sequence;
   providing the second overall probability to the second application; and
   wherein all steps of receiving, generating and providing are performed by a controlling language model component that is separate from said language model component.

9. The method of claim 8, wherein the first application is an application selected from a group consisting of a speech recognition application, a handwriting recognition application, a contextual spelling application, a proofreading application, and a parsing application.

10. The system of claim 9, wherein the second application is a different application selected from said group.

11. The system of claim 8, wherein the first application is a natural language processing application and the second application is a speech recognition application.

12. A computer-implemented method for centralizing language model functionality, the method comprising:
   receiving from a first application a first word sequence;
   generating a first set of probabilities representing a likelihood of encountering at least two sub-components of the first word sequence;
   receiving from a second application a second word sequence;
   generating a second set of probabilities representing a likelihood of encountering at least two sub-components of the second word sequence; and
   transferring to the first application the first set of probabilities; and
   transferring to the second application the second set of probabilities.

* * * * *